(12) United States Patent
Shim et al.

(10) Patent No.: US 10,095,337 B2
(45) Date of Patent: Oct. 9, 2018

(54) TOUCH DISPLAY DEVICE WITH IMPROVED TOUCH WIRING

(71) Applicant: LG DISPLAY CO., LTD., Seoul (KR)

(72) Inventors: HoanSu Shim, Incheon (KR); DeukSu Lee, Goyang-si (KR); Chulwoo Lee, Goyang-si (KR); Tae-Min Jung, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 61 days.

(21) Appl. No.: 15/222,677

(22) Filed: Jul. 28, 2016

(65) Prior Publication Data

US 2017/0315643 A1    Nov. 2, 2017

(30) Foreign Application Priority Data

Apr. 29, 2016  (KR) .......................... 10-2016-0053478

(51) Int. Cl.
  *G06F 3/041*  (2006.01)
  *G06F 3/044*  (2006.01)
(52) U.S. Cl.
  CPC .......... *G06F 3/0412* (2013.01); *G06F 3/044* (2013.01); *G06F 2203/0339* (2013.01); *G06F 2203/04103* (2013.01); *G06F 2203/04112* (2013.01)
(58) Field of Classification Search
  CPC ..................... G06F 3/0412; G06F 2203/04112
  See application file for complete search history.

(56) References Cited

U.S. PATENT DOCUMENTS

| | | | |
|---|---|---|---|
| 2015/0220206 A1 | 8/2015 | Knausz et al. | |
| 2015/0309634 A1 | 10/2015 | Lee et al. | |
| 2015/0324056 A1 | 11/2015 | Sato | |
| 2016/0291755 A1 | 10/2016 | Li et al. | |

FOREIGN PATENT DOCUMENTS

| | | | |
|---|---|---|---|
| CN | 104698701 A | | 6/2015 |
| EP | 2214084 A1 | | 8/2010 |
| EP | 2879026 | * | 6/2015 |
| EP | 2879026 A1 | | 6/2015 |
| JP | 2009-3414 A | | 1/2009 |
| JP | 2009003414 | * | 1/2009 |

* cited by examiner

*Primary Examiner* — Lisa Landis
(74) *Attorney, Agent, or Firm* — Birch, Stewart, Kolasch & Birch, LLP

(57) ABSTRACT

The present exemplary embodiments provide a touch display device which connects a touch driving circuit and a plurality of touch sensors using a plurality of dummy pixels disposed on a display panel to recognize touch event of a user. When the touch wiring line is implemented, the same material as the pixel electrode or the source line included in the plurality of dummy pixels is used so that a separate process for implementing the touch wiring line is not necessary. Further, in a pixel structure in which one data line is disposed for every two pixels, the source line is disposed in a region where the data line is not disposed to be used as a touch wiring line. Therefore, the touch recognizable area may expand as compared with a case using a pixel metal.

19 Claims, 25 Drawing Sheets

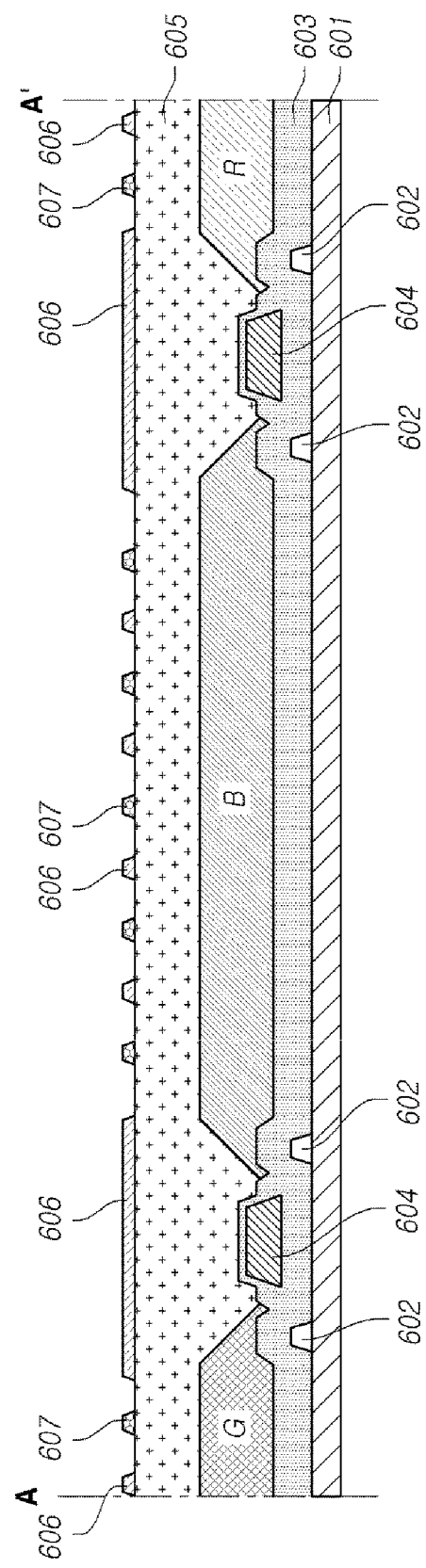

TOUCH DISPLAY DEVICE WITH IMPROVED TOUCH WIRING

CROSS-REFERENCE TO RELATED APPLICATIONS

This application claims priority from Korean Patent Application No. 10-2016-0053478 filed on Apr. 29, 2016, which is hereby incorporated by reference for all purposes as if fully set forth herein.

BACKGROUND OF THE INVENTION

Field of the Invention

The present embodiments relate to a touch display panel and a touch display device which are capable of recognizing touch event of a user.

Description of the Related Art

With the progress of the information-oriented society, various types of demands for display devices for displaying an image are increasing. Further, various types of display devices such as a liquid crystal display device, a plasma display device, and an organic light emitting display device have been used.

Recently, the above-mentioned display devices provide a touch based input method in order to provide convenience and various functions to the user.

In order to provide the touch based input method, it is required to figure out whether a touch event of a user occurs and accurately detect a touch position (touch coordinate).

To this end, as an example, a method which detects whether a touch event occurs and a touch position (touch coordinate) based on a change in capacitances between touch sensors or a change in capacitances between a touch sensor and a pointer (for example, a finger) through a plurality of touch sensors (touch electrodes) disposed on a touch display panel is frequently used.

However, in order to provide the touch based input method, a touch wiring line which is connected to the touch sensor needs to be separately designed. Further, the touch wiring line needs to be designed in consideration of an RC load with another wiring line provided in the display panel or a display hindrance factor at the time of designing the touch wiring line.

Specifically, when a touch based input method is provided in a large size display panel, due to an increased cost according to a number of touch wiring lines and touch sensors and a difficulty to design the touch wiring line, it is hard to apply the touch based input method to the large size display panel.

SUMMARY OF THE INVENTION

An aspect of the present exemplary embodiments provides a touch display panel and a touch display device which are capable of recognizing a touch event of a user.

An aspect of the present exemplary embodiments provides a touch display panel and a touch display device which are capable of recognizing whether a touch event and a drag touch event of the user occur.

An aspect of the present exemplary embodiments provides a touch display panel and touch display device which reduce an RC load with another wiring line disposed in the display panel and include a touch wiring line designed therein.

An aspect of the present exemplary embodiments provides a touch display panel and a touch display device which are capable of recognizing a touch event of a user in a large size display panel.

According to an aspect of the present disclosure, there is provided a touch display device, comprising: a display panel including a display region in which a plurality of driving pixels is disposed and a non-display region in which a plurality of electrode patterns is disposed; a plurality of touch sensors disposed in the display region; and a touch driving circuit which drives the plurality of touch sensors.

Herein, the plurality of electrode patterns disposed in the non-display region may be dummy pixels.

In the touch display device, the touch driving circuit may be electrically connected to the plurality of touch sensors disposed in the display region through the plurality of dummy pixels disposed in the non-display region.

Herein, in the plurality of dummy pixels, the dummy pixels which are electrically connected to the same touch sensor may be electrically connected to each other and dummy pixels which are electrically connected to different touch sensors may be disposed to be spaced apart from each other.

For example, the dummy pixels may be divided in the unit corresponding to a width of the touch sensor which is connected to the dummy pixel, to be connected to each other.

Further, the plurality of touch sensors may be disposed in one line to be spaced apart from each other in a partial area of the display region adjacent to the non-display region.

As an example, the touchy display device may include a first connecting unit which electrically connects the touch driving circuit and the plurality of dummy pixels disposed in the non-display region in order to electrically connect the touch driving circuit and the plurality of touch sensors. Further, the touch display device may include a second connecting unit which electrically connects the plurality of dummy pixels and the plurality of touch sensors disposed in the display region.

In this case, the first connecting unit and the second connecting unit may be formed of the same material as a material which configures a pixel electrode included in the plurality of dummy pixels.

Alternatively, the first connecting unit and the second connecting unit may be formed of the same material as a material which configures a source line included in the plurality of dummy pixels.

The first connecting unit and the second connecting unit may be a signal line which is located on a layer different from a layer on which a pixel electrode or a source line included in the plurality of dummy pixels is disposed.

The second connecting unit which electrically connects the plurality of dummy pixels and the plurality of touch sensors may be electrically connected to the plurality of touch sensors through a signal line which is located on a layer different from a layer on which a pixel metal, source line, pixel electrode or source line included in the plurality of driving pixels is disposed.

The touch driving circuit may output touch driving signals which drives the plurality of touch sensors during a blank period of one frame period or may time-divide one frame period into a display driving period and a touch driving period to output a touch driving signal during a touch driving period.

The touch driving signal output by the touch driving circuit may be transmitted to the plurality of touch sensors through the first connecting unit which electrically connects the touch driving circuit and the plurality of dummy pixels, the plurality of dummy pixels, and a second connecting unit which electrically connects the plurality of dummy pixels and the plurality of touch sensors.

According to another aspect of the present disclosure, there is provided a plurality of touch sensors disposed in a display region, which may be configured by a first touch sensor unit including a plurality of touch sensors which is disposed in one line to be spaced apart from each other in a partial area of the display region adjacent to the non-display region and a second touch sensor unit including a plurality of touch sensors which is disposed in one line to be spaced apart from each other in a region separated from the region where the first touch sensor unit is disposed.

In this case, the touch driving circuit may be electrically connected to the first touch sensor unit through a pixel electrode included in the plurality of dummy pixels and the touch driving circuit may be electrically connected to the second touch sensor unit through a source line included in the plurality of dummy pixels.

According to another aspect of the present disclosure, there is provided a touch display panel including a display region in which a plurality of driving pixels is disposed and a non-display region in which a plurality of dummy pixels is disposed, which includes a plurality of touch sensors disposed in the display region and a touch driving circuit which is disposed in the non-display region and drives the plurality of touch sensors. Herein, the touch driving circuit and the plurality of dummy pixels are electrically connected and the plurality of dummy pixels and the plurality of touch sensors are electrically connected.

According to the present exemplary embodiments, a touch display panel and a touch display device which are capable of recognizing a touch event of a user may be provided.

According to the present exemplary embodiments, a touch driving circuit and a plurality of touch sensors are electrically connected through a plurality of dummy pixels disposed in a non-display region or an electrode pattern which is divided in the unit corresponding to a width of the touch sensor. Therefore, it is advantageous because there is no need to design a separate signal line for touch sensing.

According to the exemplary embodiments, a touch event of the user may be recognized without affecting a display performance in a large size display device using an advantage of a wiring line design for touch sensing.

According to the present exemplary embodiments, a connecting method of a touch driving circuit and a touch sensor varies depending on a structure of a pixel disposed on a touch display panel. Therefore, a user's touch event recognizing performance may be maximized in the touch display device.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 6A and 6B are a plane view and a cross-sectional view of a driving pixel including a wiring line which connects a touch driving circuit and a touch sensor in a touch display device according to a first exemplary embodiment;

DETAILED DESCRIPTION OF THE PREFERRED EMBODIMENTS

Figure 1:
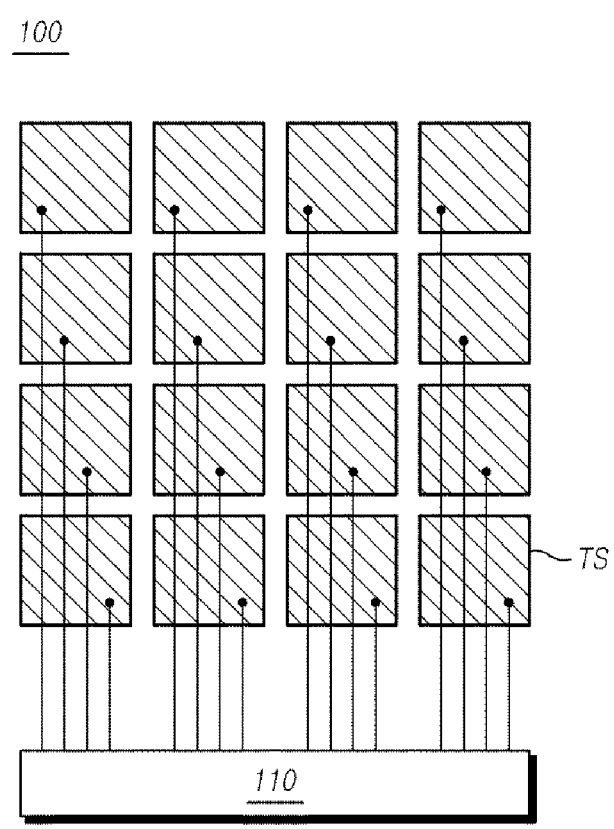
FIGS. 1 and 2 are views explaining a schematic configuration and a touch recognizing method of a touch display device according to the present exemplary embodiments.

Hereinafter, some embodiments of the present invention will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Further, in describing components of the present disclosure, terminologies such as first, second, A, B, (a), (b), and the like may be used. The terminologies are used to distinguish one component from another component. However, a nature, an order, a sequence, or the number of components is not limited by the terminologies. If it is described that a component is "connected" or "coupled" to another component, it is understood that the component is directly connected or coupled to the other component but a component may be interposed between the components or the components may be "connected" or "coupled" through another component.

FIG. 1 is a view illustrating a schematic configuration of a touch display device 100 according to the present exemplary embodiments. All the components of the touch display device according to all embodiments of the present invention are operatively coupled and configured.

Referring to FIG. 1, the touch display device 100 according to the present exemplary embodiments may include a plurality of touch sensors TS disposed on a display panel to recognize a touch event of a user, a pad unit 110 in which a touch driving circuit is disposed to output a touch driving signal to the plurality of touch sensors TS, and a wiring line (hereinafter, referred to as a "touch wiring line") which connects the plurality of touch sensors TS and the touch driving circuit.

The plurality of touch sensors TS may be disposed to be separated in each region of the display panel to sense whether a touch event of the user occurs and a touch position (touch coordinate). The plurality of touch sensors TS may be formed as blocks, as illustrated in FIG. 1. However, the touch sensors are not limited thereto and may have any shape if the touch sensors are separated.

The plurality of touch sensors TS is applied with a touch driving signal from the touch driving circuit disposed in the pad unit 110 during a touch driving period to sense the touch event of the user. When the touch event of the user occurs, the touch sensing signal is transmitted to the touch driving circuit to sense the touch event of the user.

Further, when the display panel drives in a display mode, the plurality of touch sensors TS may be used as a common electrode to which a common voltage for a display driving mode is applied.

That is, during the display driving period, the touch sensors are applied with a display driving signal from a driver integrated circuit disposed in the pad unit 110 to operate as a common electrode. Further, during the touch driving period, the touch sensors are applied with a touch driving signal from the touch driving circuit to operate as touch sensors TS.

As illustrated in FIG. 1, the plurality of touch sensors TS and the touch driving circuit disposed in the pad unit 110 may be electrically connected through a touch wiring line for touch driving/sensing.

The touch wiring line electrically connects the plurality of touch sensors TS and the touch driving circuit to transmit a touch driving signal and a touch sensing signal.

The touch wiring line may be disposed to be parallel to a data line disposed on the display panel or may be disposed so as not to be overlaid with the data line to reduce an RC load.

Hereinafter, a method of sensing a touch event of a user by the touch display device 100 according to the present exemplary embodiments will be described with reference to FIG. 2.

Figure 2:
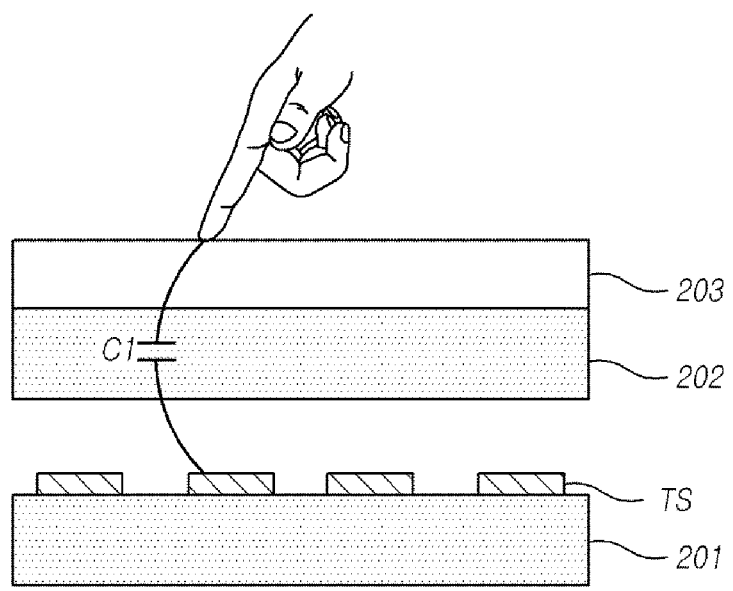

FIG. 2 illustrates a method of sensing a touch event of a user by the touch display device 100 according to the present exemplary embodiments.

Referring to FIG. 2, a plurality of touch sensors TS is disposed between a first substrate 201 and a second substrate 202 to be separated from each other. A thin film transistor is disposed on the first substrate 201 and a color filter is disposed on the second substrate 202.

When the user touches the display panel, a capacitance change is generated between a pointer such as a finger of the user and the plurality of touch sensors TS. The capacitance change is sensed to sense whether a touch event of the user occurs and the touch position (touch coordinate).

Therefore, according to the touch display device 100 according to the present exemplary embodiments, common electrodes are disposed to be separated for every predetermined area in a basic structure of a display device to be used as touch sensors TS. Therefore, a touch display device 100 which is capable of recognizing the touch event of the user may be provided.

In the touch display device 100, a separate touch wiring line which is parallel to the data line is disposed to implement the above-described touch function.

In this case, the touch wiring line needs to be designed to have a sufficient width to reduce delay occurred due to a resistance.

Further, when the touch driving signal is applied to the touch wiring line, a minute capacitance may be generated between the touch wiring line and the data line by a signal which is applied to the data line disposed to be parallel to the touch wiring line. The minute capacitance may affect to sense the touch event of the user by sensing a capacitance generated between the touch sensor and the pointer.

Therefore, the touch wiring line needs to be designed such that no capacitance with the data line is generated so as not to affect the touch sensing. Alternatively, when the touch driving signal is applied to the touch wiring line, road free driving (RFD) by which a similar signal (for example, an equivalent potential) is applied to the data line needs to be performed.

That is, when the touch wiring line for sensing the touch event of the user is designed based on the structure of the display device of the related art, an aperture ratio reduced due to a width of the touch wiring line and capacitance with another signal wiring line need to be considered.

It is further difficult to design the touch wiring line in the large size display. In a self-capacitive type which requires more touch driving circuits than that in a mutual capacitive type, when the large size touch display device is implemented, there is a limitation in accordance with a touch wiring line design and an increased number of touch driving circuits and touch sensors TS.

According to the present exemplary embodiments, a touch wiring line structure of the touch display device 100 is improved, so that a touch display device 100 which is capable of recognizing the touch event of the user even in the large size display device is provided.

The touch display device 100 according to the present exemplary embodiments can recognize the touch event of the user in the large size display device. Hereinafter, a structure of the display panel which partially recognizes the touch event will be mainly described, but the present exemplary embodiments are not limited thereto.

Figure 3:
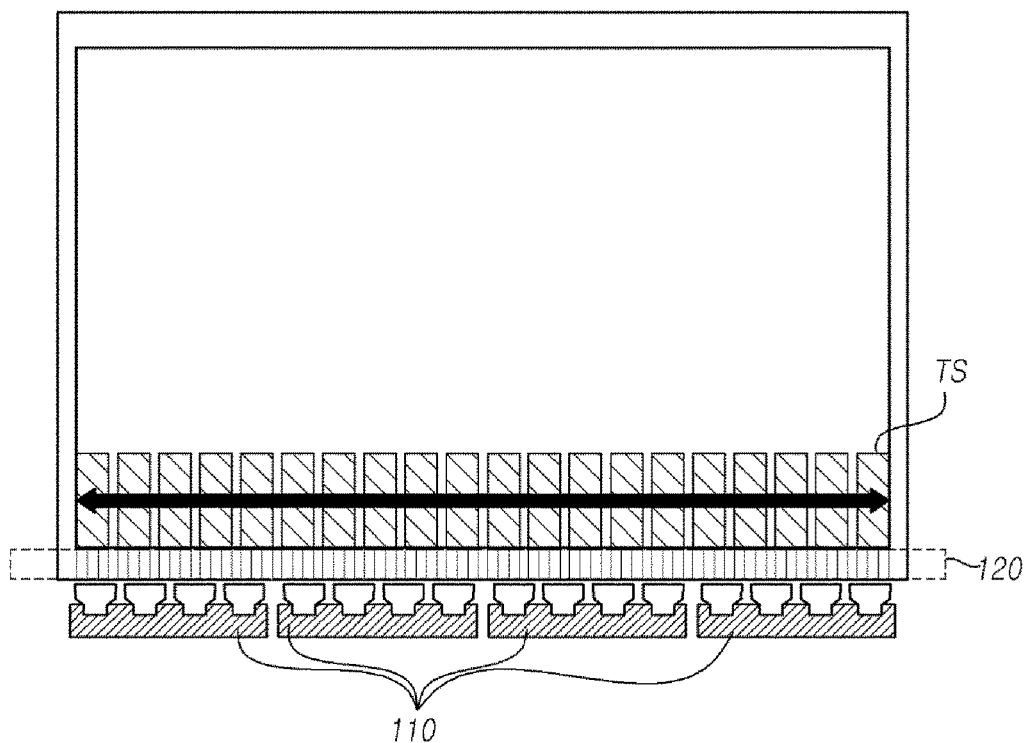
FIG. 3 is a view illustrating a schematic configuration of a touch display device according to a first exemplary embodiment.

FIG. 3 illustrates a schematic configuration of a touch display device 100 according to a first exemplary embodiment.

Referring to FIG. 3, in the touch display device 100 according to the first exemplary embodiment, a display panel may be configured by a display region where a plurality of driving pixels is disposed and a non-display region where a plurality of dummy pixels 120 is disposed.

In this specification, the "driving pixel" refers to a pixel which is disposed in a region of the display region defined by a gate line and a data line and is driven during a display driving period. Further, the "dummy pixel" refers to a pixel which is not driven because the pixel includes a gate line and a data line but does not include a driving transistor or the driving transistor and the data line are not connected to each other.

A plurality of touch sensors TS to recognize the touch event of the user is disposed in the display region of the display panel. In the pad unit 110, a driver integrated circuit for display driving of the display panel and a touch driving circuit for touch driving may be disposed.

The touch driving circuit disposed in the pad unit 110 and the plurality of touch sensors TS disposed in the display region are electrically connected through a plurality of dummy pixels 120 disposed in the non-display region. According to the present exemplary embodiments, a display device which simplifies the touch wiring line and recognizes the touch event of the user may be provided.

Further, the plurality of dummy pixels 120 which connects the touch driving circuit and the plurality of touch sensors TS is an example. Therefore, an electrode pattern which is disposed in the non-display region may be used to electrically connect the touch driving circuit and the plurality of touch sensors TS in the touch display device 100 according to the present exemplary embodiments.

The plurality of touch sensors TS may be disposed in one line to be spaced apart from each other in a partial area of the display region of the display panel where a plurality of driving pixels is disposed.

The plurality of touch sensors TS may be disposed in a horizontal direction as illustrated in FIG. 3. However, the plurality of touch sensors TS may be disposed in a vertical direction.

The plurality of touch sensors TS is disposed to be spaced apart from each other to sense whether a touch event of a user occurs or a touch position (touch coordinate) and sense drag touch in accordance with a horizontal motion of the touch event of the user.

The plurality of dummy pixels 120 is disposed in the non-display region of the display panel.

In the plurality of dummy pixels 120, adjacent dummy pixels 120 are electrically connected to each other. The plurality of dummy pixels 120 may be disposed to be separated in the unit of dummy pixel 120 corresponding to a width of the touch sensor TS which is connected to the dummy pixel 120.

For instance, the dummy pixels 120 may be disposed to be separated in the unit corresponding to the width of the touch sensor TS.

In the touch display device 100 according to the present exemplary embodiments, the plurality of touch sensors TS disposed in the display panel and the touch driving circuit disposed in the pad unit 110 are connected through the plurality of dummy pixels 120 disposed in the non-display region of the display panel, so that the touch event of the user may be sensed without using a separate touch wiring line.

For instance, the touch wiring line which connects the plurality of touch sensors TS and the touch driving circuit is formed while manufacturing a pixel electrode included in the dummy pixels 120 without providing a separate process for manufacturing a touch wiring line. Therefore, the touch wiring line may be easily designed while reducing the manufacturing processes.

Figure 4:
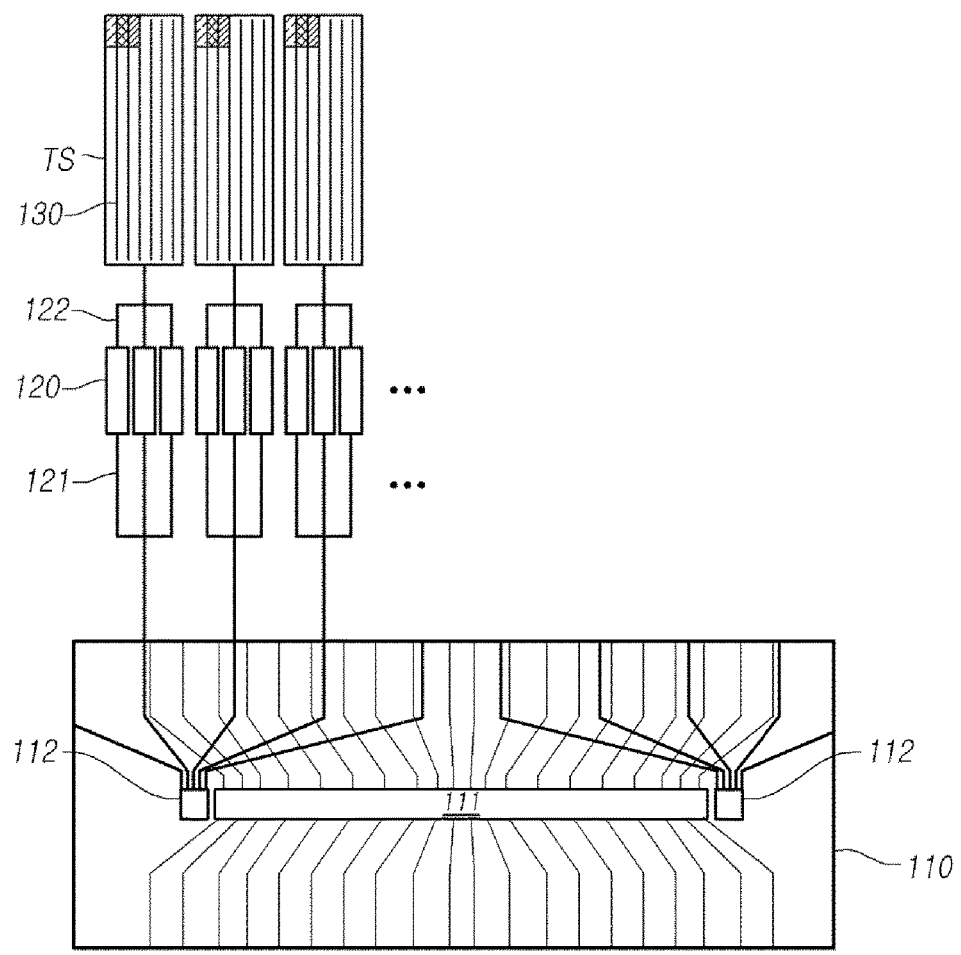
FIG. 4 is a view illustrating a specific connection relationship of a touch display device according to a first exemplary embodiment.

FIG. 4 illustrates a specific connection relationship structure of the touch display device 100 according to the first exemplary embodiment.

Referring to FIG. 4, the touch driving circuit 112 disposed in the pad unit 110 is electrically connected to the plurality of dummy pixels 120 disposed in the non-display region of the display panel through a first connecting unit 121.

The plurality of dummy pixels 120 is electrically connected to the plurality of touch sensors TS disposed in the display region of the display panel through a second connecting unit 122.

In the plurality of dummy pixels 120, dummy pixels 120 which are electrically connected to the same touch sensor TS are electrically connected to each other and are disposed to be spaced apart from dummy pixels 120 which are electrically connected to different touch sensors TS.

In this case, the first connecting unit 121 and the second connecting unit 122 may be configured by the same material (for example, a pixel metal) as a material which configures a pixel electrode included in the plurality of dummy pixels 120.

Accordingly, the first connecting unit 121 and the second connecting unit 122 are manufactured to form the touch wiring line while manufacturing the pixel electrode included in the plurality of dummy pixels 120. Therefore, a separate process for manufacturing the touch wiring line is not necessary.

That is, the touch event of the user may be sensed while reducing the number of masks for implementing a touch wiring line.

The second connecting unit 122 may be electrically connected to the plurality of touch sensors TS through a pixel metal of the driving pixel disposed in a region corresponding to the plurality of touch sensors TS.

For instance, a touch driving signal output from the touch driving circuit 112 during the touch driving period may be transmitted to the touch sensor TS through the first connecting unit 121, the dummy pixel 120, the second connecting unit 122, and the pixel metal included in the driving pixel.

Therefore, according to the present exemplary embodiments, the touch wiring line is implemented using the plurality of dummy pixels 120 disposed in the non-display region of the display panel. As a result, a touch display device 100 in which the touch wiring line design is simplified, the number of processes for touch wiring line design is reduced, and the touch event of the user is recognized may be provided.

Figure 5:
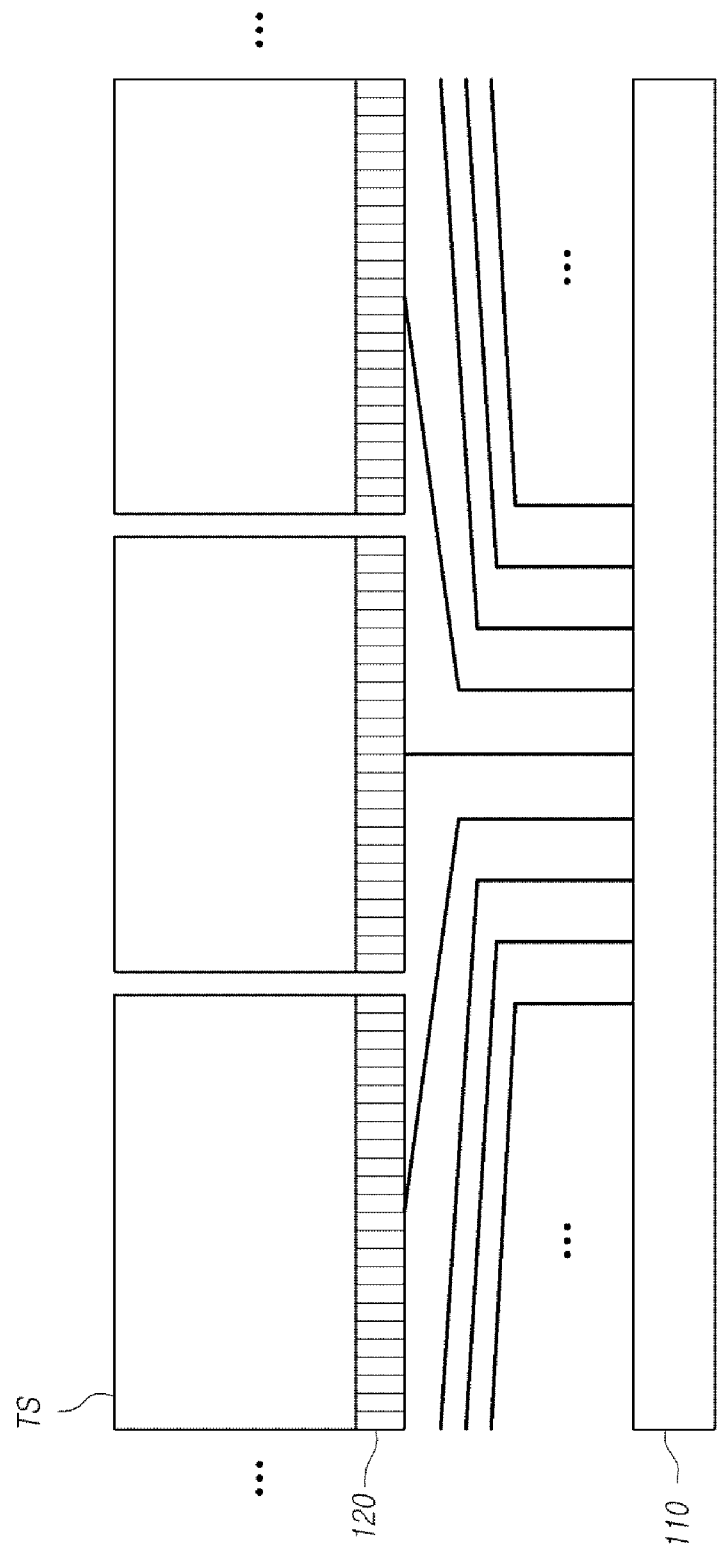
FIG. 5 is a plane view illustrating a portion where a touch driving circuit and a touch sensor are connected in a touch display device according to a first exemplary embodiment.

FIG. 5 is a plane view illustrating a connection portion where a plurality of touch sensors TS and a touch driving circuit 112 are connected in a touch display device 100 according to a first exemplary embodiment.

Referring to FIG. 5, the plurality of touch sensors TS which is disposed in an area of the display region of the display panel which is adjacent to the non-display region has a predetermined size and disposed to be spaced apart from each other.

Further, the driving pixels located at borders of the touch sensors TS are disposed to be spaced apart from each other.

Each touch sensor TS is electrically connected to the touch driving circuit 112 disposed in the pad unit 110 through the plurality of dummy pixels 120.

In the plurality of dummy pixels 120, dummy pixels 120 which are connected to the same touch sensor TS are electrically connected to each other and are disposed to be spaced apart from dummy pixels 120 which are connected to different touch sensors TS.

Therefore, during the touch driving period, the touch driving signal output from the touch driving circuit 112 is transmitted to each of the touch sensors TS through the electrically connected dummy pixels 120.

The plurality of dummy pixels 120 disposed in the non-display region of the display panel is divided in the unit of touch sensors TS and the touch sensor TS and the touch driving circuit 112 are electrically connected to implement the touch wiring line using the dummy pixel 120.

Figure 6A:
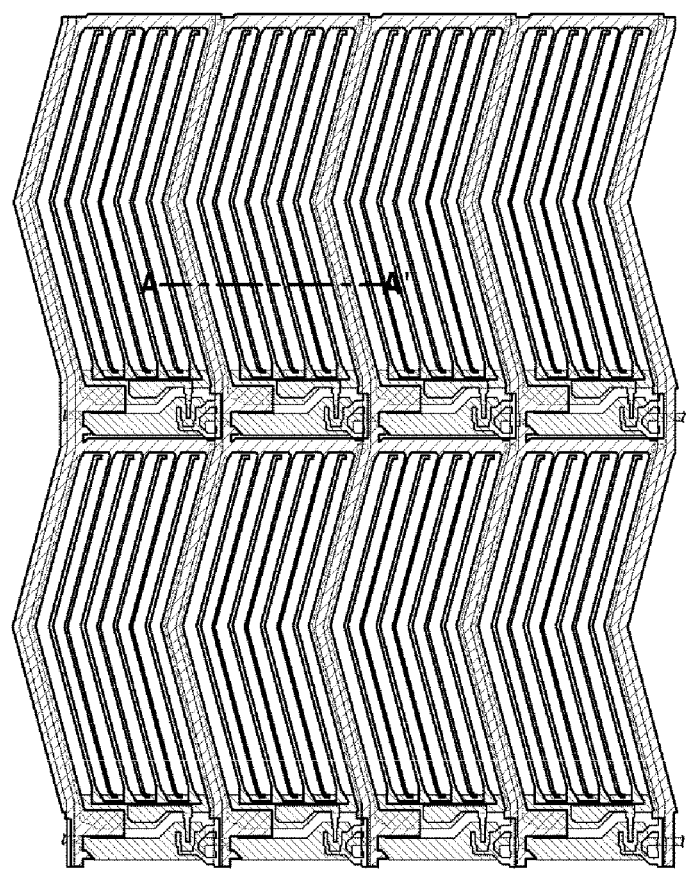

FIGS. 6A and 6B are a plane view and a cross-sectional view of a driving pixel when the pixel electrode is used as a touch wiring line in the touch display device 100 according to the first exemplary embodiment and FIG. 6B is a cross-sectional view taken along the line A-A' of FIG. 6A.

Referring to FIG. 6B, a gate metal 602 is disposed on a substrate 601 and a gate insulating layer 603 is disposed thereon. A data line 604 and a color filter are disposed on the gate insulating layer 603 and an organic layer or inorganic layer 605 is disposed thereon. A common electrode 606 and a pixel electrode 607 are disposed on a top surface of the organic layer or inorganic layer 605.

The gate metal 602 and the data line 604 are used as signal transmitting wiring lines while the touch display device 100 performs display driving.

The gate metal 602 is electrically connected to the common electrode 606 which is located on the top surface of the organic layer or inorganic layer 605 through the gate insulating layer 603 which is located above the gate metal 602 and a contact hole which is formed in the organic layer or inorganic layer 605.

For instance, the gate metal 602 is used as a signal wiring line which transmits a common voltage to the common electrode 606 during a display driving period.

The data line 604 may be formed of an active layer which configures a driving transistor or a material which configures a source/drain electrode.

The data line 604 is electrically connected to the pixel electrode 607 which is located on the top surface of the organic layer or inorganic layer 605 through the contact hole which is formed in the organic layer or inorganic layer 605 located above the data line 604.

Therefore, during the display driving period, a common voltage is applied to the common electrode 606 through the gate metal 602 and a data voltage is applied to the pixel electrode 607 through the data line 604.

In the meantime, during the touch driving period, a touch driving signal is applied to the touch sensor TS through the touch wiring line and a change in capacitances between the pointer and the touch sensor TS is sensed to sense the touch event of the user.

Here, the touch sensor TS may be the common electrode 606 which is located on the top surface of the organic layer or inorganic layer 605.

For instance, the common electrode 606 serves as an electrode to which the common voltage is applied during the display driving period and serves as a touch sensor TS to which a touch driving signal is applied during the touch driving period.

In the touch display device 100 according to the first exemplary embodiment, the pixel metal which is disposed on the top surface of the organic layer or inorganic layer 605 is used as a touch wiring line, so that a separate signal line or layer for the touch wiring line is not necessary.

For instance, the pixel metal included in the driving pixel is electrically connected to the second connecting unit 122 connected to the dummy pixel 120. Therefore, the touch driving signal output from the touch driving circuit 112 is transmitted to the common electrode 606 which is the touch sensor TS through the first connecting unit 121, the dummy pixel 120, the second connecting unit 122, and the pixel metal included in the driving pixel.

Therefore, in the driving pixel located in an area of the display panel where the touch sensor TS is disposed, a touch wiring line which connects the touch sensor TS and the touch driving circuit are not separately disposed. By doing this, the touch event of the user may be recognized while reducing a process required for the touch wiring line and providing a simplified pixel structure.

In the meantime, in the touch display device 100 according to a second exemplary embodiment, when the touch driving circuit 112 and the touch sensor TS are connected using the plurality of dummy pixels 120 disposed in the non-display region of the display panel, the touch wiring line is implemented through a source line included in the dummy pixel 120. Therefore, performance of recognizing a touch event may be further improved.

For example, in a general pixel structure, one gate line and one data line 604 (or a source line) are alternately disposed for every pixel. Further, in a structure in which one data line 604 is commonly used by pixels at both sides, one data line 604 is disposed for every two pixels so that there may be a region where the data line 604 is not disposed.

For instance, in the structure in which one data line 604 is disposed for every two pixels, a source line is disposed in the region where the data line 604 is not disposed and the disposed source line is used as a touch wiring line. Therefore, without providing a separately configured touch wiring line, the touch event of the user may be recognized.

Figure 7:
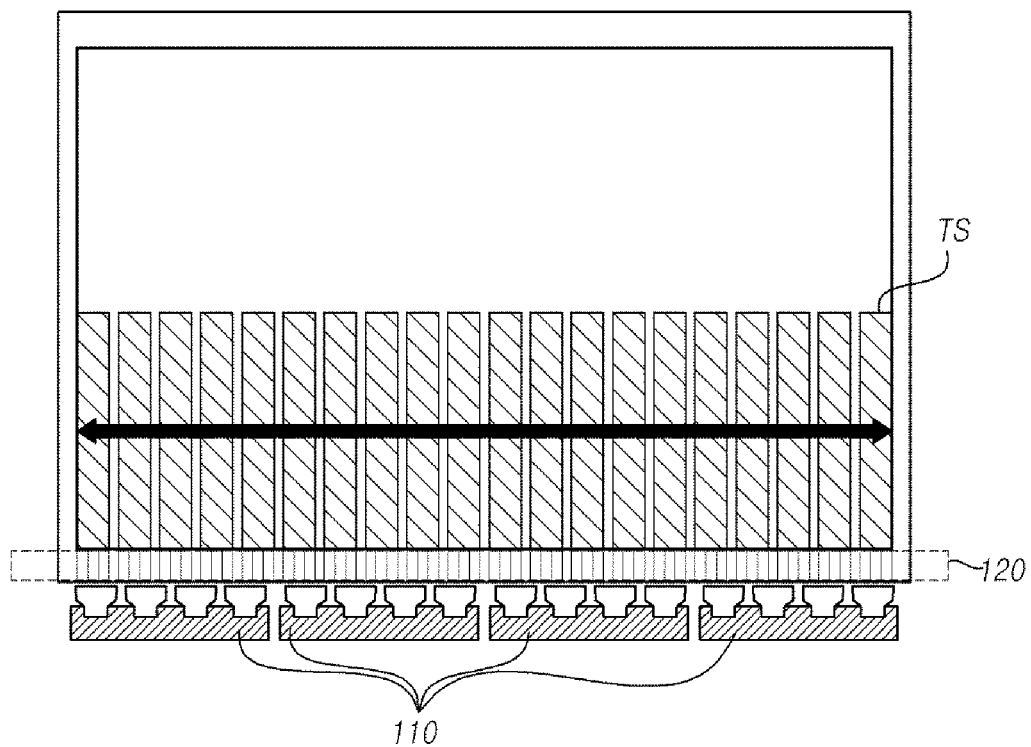
FIG. 7 is a view illustrating a schematic configuration of a touch display device according to a second exemplary embodiment.

FIG. 7 illustrates a schematic configuration of the touch display device 100 according to the second exemplary embodiment and illustrates an example which implements a touch wiring line in a structure in which one data line 604 is disposed for every two pixels.

Referring to FIG. 7, in the touch display device 100 according to the second exemplary embodiment, a plurality of touch sensors TS is disposed in one line to be spaced apart from each other in the display region of the display panel.

Each touch sensor TS is connected to the driving circuit 112 disposed in the pad unit 110 through the plurality of dummy pixels 120 disposed in the display panel.

In this case, the plurality of touch sensors TS and the touch driving circuit 112 are electrically connected to each other through source lines included in the plurality of dummy pixels 120.

For instance, a wiring line which connects the dummy pixel 120 and the touch driving circuit 112 and a wiring line which connects the dummy pixel 120 and the touch sensor TS are configured together during a process of manufacturing the source lines included in the dummy pixel 120. Therefore, the touch driving circuit 112 and the plurality of touch sensors TS are connected through the dummy pixels 120.

Here, the wiring line which connects the dummy pixel 120 and the touch sensor TS is connected to the plurality of touch sensors TS through the source line which is located in a region of the driving pixel disposed in the display region where the data line 604 is not disposed.

Alternatively, the wiring line which connects the dummy pixel 120 and the touch sensor TS may be connected to the plurality of touch sensors TS through the pixel metal included in the driving pixel.

When the wiring line is connected to the plurality of touch sensors TS not through the pixel metal included in the driving pixel, but through the source line, a resistance of the source line is approximately one hundredth of a resistance of the pixel metal because a thickness of the source line is larger than a thickness of the pixel metal. Therefore, as compared with a case when the touch driving signal is transmitted through the pixel metal, the source line may be designed to be longer. Therefore, a region where the touch sensing is available may expand.

Further, the source line is disposed in a region where the data line 604 is not disposed and the disposed source line is used as a touch wiring line. Therefore, the touch wiring line may be designed so as not to be affected by the capacitance generated when the touch wiring line and the data line 604 are disposed to be parallel to each other.

Therefore, when the source line which is disposed in the region where the data line 604 is not disposed and has approximately one hundredth of a resistance of the pixel metal is used as the touch wiring line, the RC load is reduced. Therefore, a touch wiring line structure which may sense the touch event of the user in a broad region even in the large size display panel may be provided.

Figure 8:
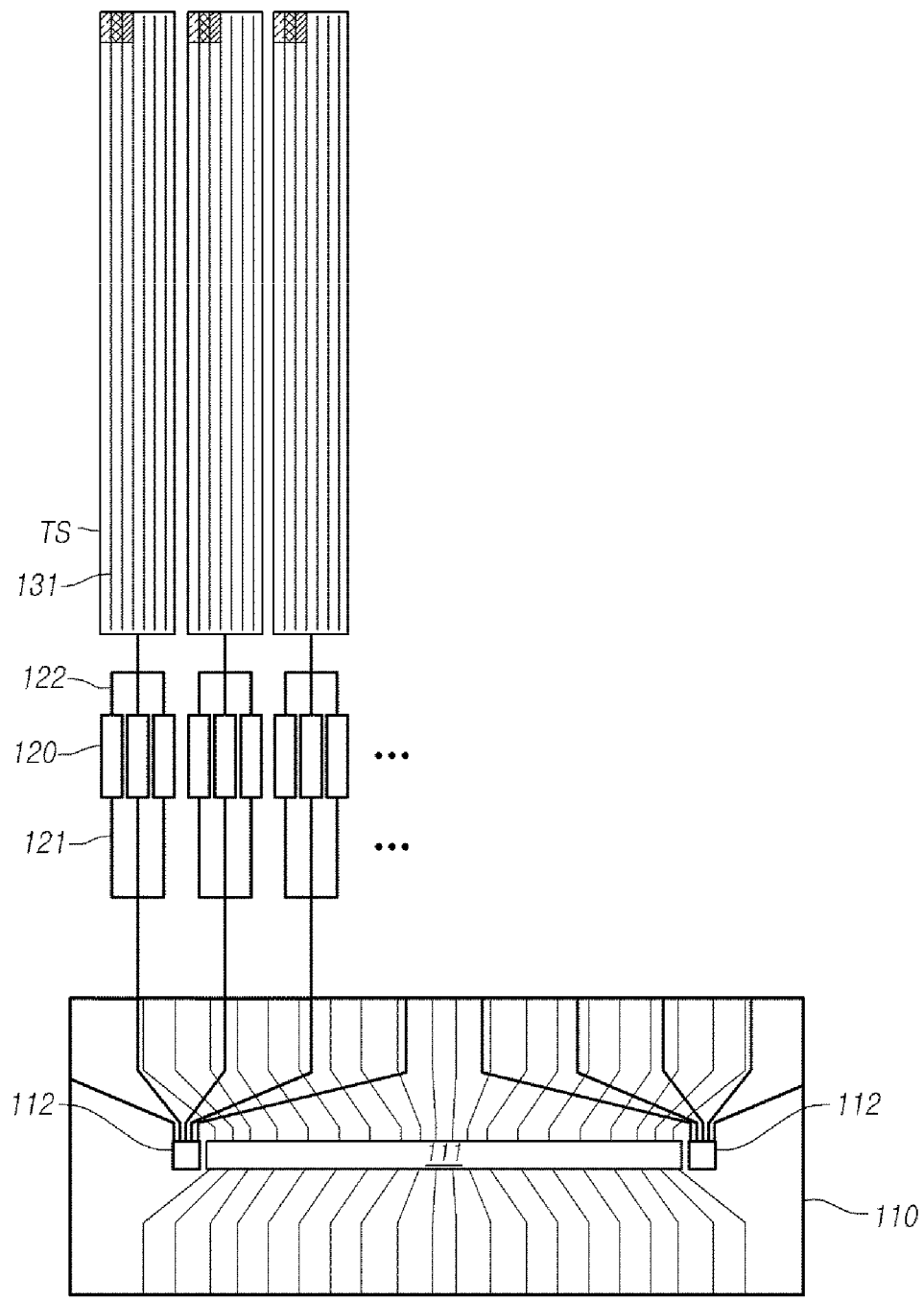
FIG. 8 is a view illustrating a specific connection relationship of a touch display device according to a second exemplary embodiment.

FIG. 8 illustrates a specific structure in which the touch driving circuit 112 and the plurality of touch sensors TS are connected through the dummy pixel 120 in the touch display device 100 according to the second exemplary embodiment.

Referring to FIG. 8, the touch driving circuit 112 disposed in the pad unit 110 and the plurality of touch sensors TS disposed in the display region are electrically connected to each other through the plurality of dummy pixels 120 disposed in the non-display region.

The touch driving circuit 112 and the plurality of touch sensors TS are electrically connected through the first connecting unit 121 which connects the touch driving circuit 112 and the dummy pixel 120 and the second connecting unit 122 which connects the dummy pixel 120 and the plurality of touch sensors TS.

In this case, the first connecting unit 121 and the second connecting unit 122 may be configured by the same material (for example, a source metal) as a material which configures a source line included in the plurality of dummy pixels 120.

Accordingly, the first connecting unit 121 and the second connecting unit 122 are manufactured while manufacturing the source line included in the plurality of dummy pixels 120. Therefore, a separate process for manufacturing the touch wiring line is not necessary.

The second connecting unit 122 may be electrically connected to the plurality of touch sensors TS, that is, the common electrode 606 through the pixel metal included in the driving pixel disposed in the display region, similarly to the first exemplary embodiment.

When the second connecting unit 122 is connected to the pixel metal included in the driving pixel, the second connecting unit 122 may be electrically connected to the pixel metal through a contact hole formed in an insulating layer which is disposed above a layer where the data line 604 is disposed in the driving pixel.

Alternatively, the second connecting unit 122 may be electrically connected to the plurality of touch sensors TS through the source line included in the driving pixel disposed in the display region.

Here, the source line to which the second connecting unit 122 is connected refers to a source line which is disposed in a region of the driving pixel where the data line 604 is not disposed. Therefore, the source line is disposed in a region where the data line 604 is not disposed and the disposed source line is used as a touch wiring line.

Therefore, as compared with a case when the second connecting unit 122 is connected to the touch sensor TS through the pixel metal included in the driving pixel, the second connecting unit 122 is connected to the touch sensors TS through the source line. Therefore, the touch sensor TS may be configured such that a vertical length is long. By doing this, a touch recognizable area which is implemented below the display panel may expand.

Further, the touch sensible region expands to a vertical direction of the display panel so that the touch event of the user may be sensed not only in a lower portion of the display panel, but also in a center portion of the display panel.

For instance, when the touch wiring line is implemented through the source line, the touch event may be sensed in a lower portion of the display panel or in the center portion, or in both the lower portion and the center portion.

Figure 9A:
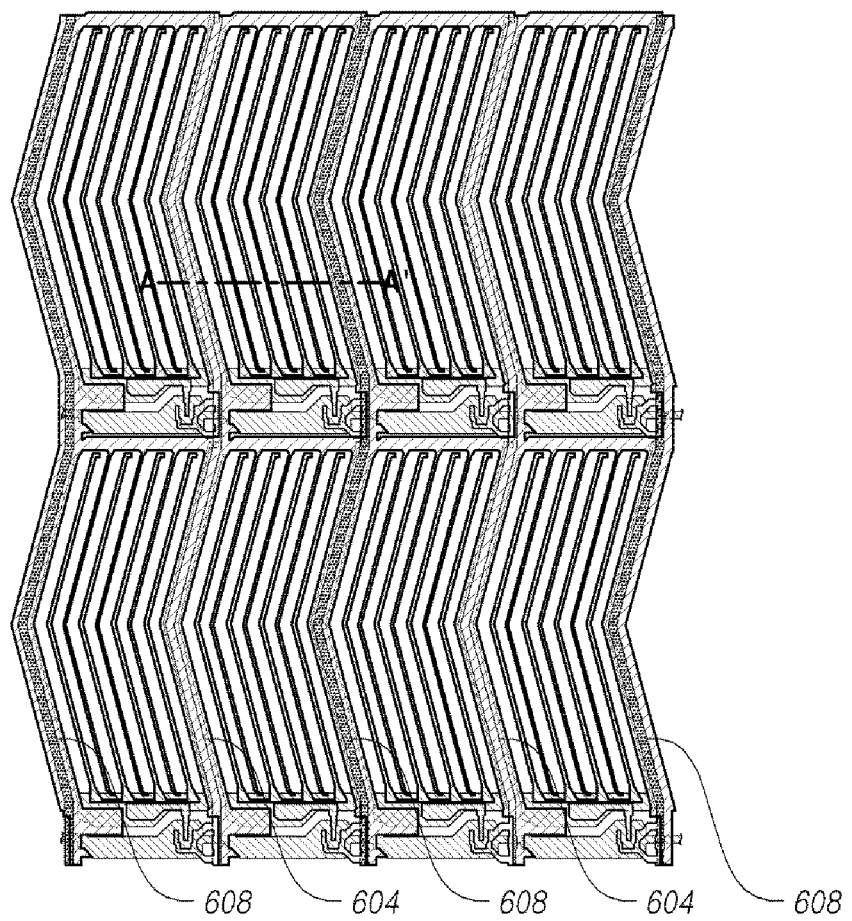
FIGS. 9A and 9B are a plane view and a cross-sectional view of a driving pixel including a wiring line which connects a touch driving circuit and a touch sensor in a touch display device according to a second exemplary embodiment.
Figure 9B:
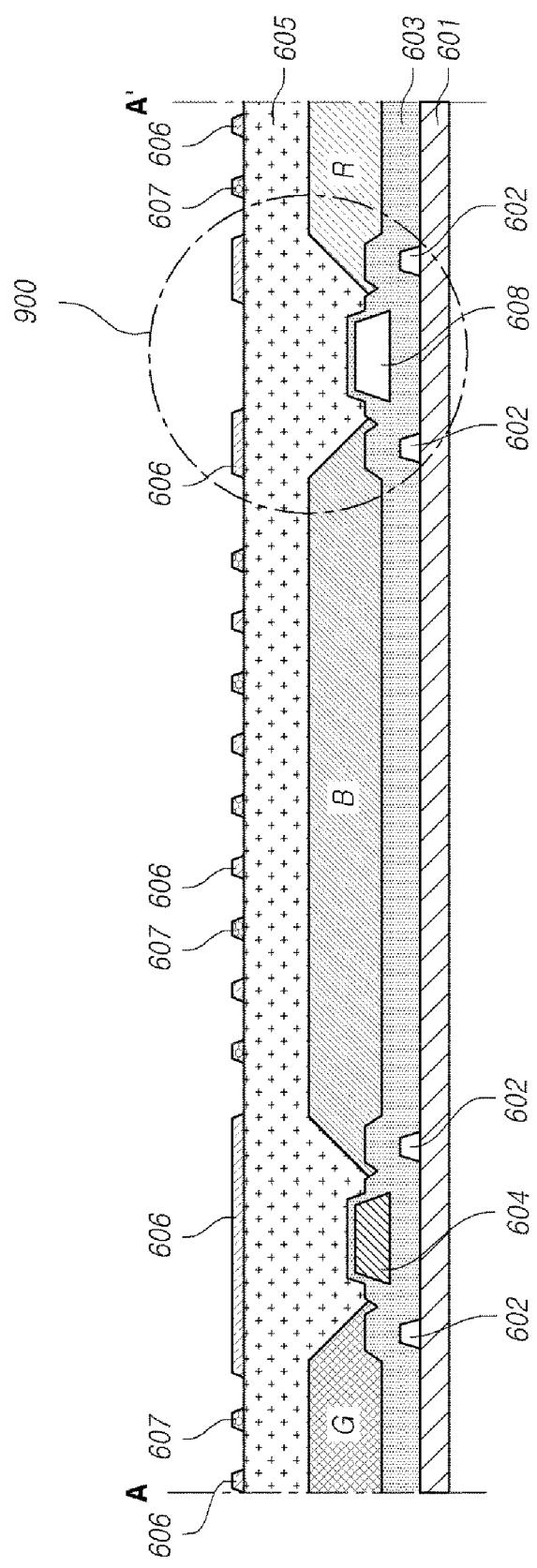

FIGS. 9A and 9B are a plane view and a cross-sectional view when a touch wiring line is formed in the driving pixel through the source line in the touch display device 100 according to the second exemplary embodiment and FIG. 9B illustrates a cross-sectional view taken along the line A-A' of FIG. 9A.

Referring to FIG. 9B, a gate metal 602 is disposed on a substrate 301 and a gate insulating layer 603 is disposed thereon. A data line 604 and a color filter are disposed on the gate insulating layer 603 and an organic layer or inorganic layer 605 is disposed thereon. A common electrode 606 and a pixel electrode 607 are disposed on a top surface of the organic layer or inorganic layer 605.

During the display driving period, when the common voltage and the scan signal are applied to the common electrode 606 through the gate metal 602, the data voltage is applied to the pixel electrode 607 through the data line 604 to perform the display driving.

During the touch driving period, a touch driving signal is applied to the touch sensor TS through the touch wiring line and a change in capacitances between the pointer and the touch sensor TS is sensed to sense the touch event of the user.

In the touch display device 100 according to the second exemplary embodiment, the pixel metal disposed on the top surface of the organic layer or inorganic layer 605 may be used as the touch wiring line. However, the source line 608 is disposed in a region 900 where the data line 604 is not disposed and the disposed source line 608 may be used as the touch wiring line.

For instance, in the structure in which the data line 604 is disposed in every driving pixel, the pixel metal included in the driving pixel is used as a touch wiring line. In the structure in which one data line 604 is disposed for every two driving pixel, the pixel metal is used as a touch wiring line or the source line 608 is disposed in the region where the data line 604 is not disposed and used as a touch wiring line.

Therefore, the pixel metal or the source line 608 included in the driving pixel is used as a touch wiring line so that it is advantageous because a separate manufacturing process for the touch wiring line is not necessary.

Further, when the touch wiring line is implemented by the source line 608 disposed in the driving pixel, the thickness of the source line 608 is larger than that of the pixel metal so that the resistance of the source line 608 is approximately one hundredth of the resistance of the pixel metal. Therefore, the delay generated due to the resistance of the wiring line is reduced so that the touch recognizable area may expand as compared with the case when the touch wiring line is implemented by the pixel metal.

Further, the influence due to the capacitance with the data line 604 is reduced using the structure in which the touch wiring line is not disposed to be parallel to the data line 604. Therefore, a touch wiring line structure which senses the touch event of the use while reducing the RC load of the touch wiring line may be provided.

FIGS. 10 to 13 illustrate an enlarged view of a region 900 of FIG. 9 and illustrate an example in which the touch wiring line is implemented by the pixel metal or the source line 608 included in the driving pixel in the structure in which one data line 604 is disposed for every two driving pixels.

Figure 10:
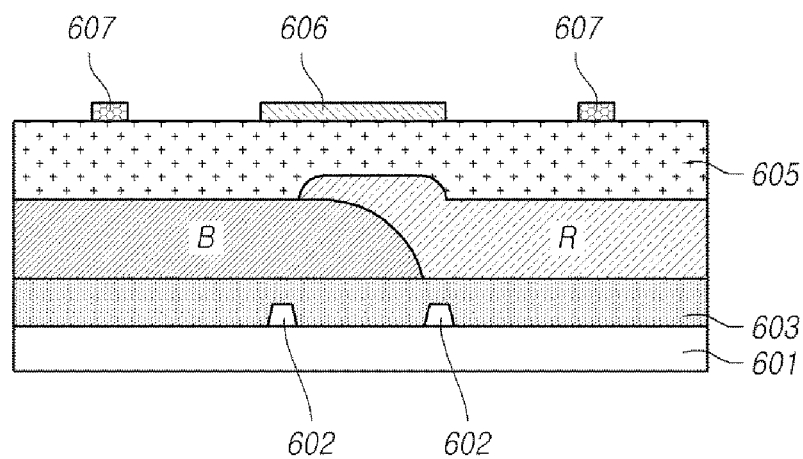
FIGS. 10 to 13 are views illustrating an example of a wiring line which connects a touch driving circuit and a touch sensor in a touch display device according to a second exemplary embodiment.
Figure 11:
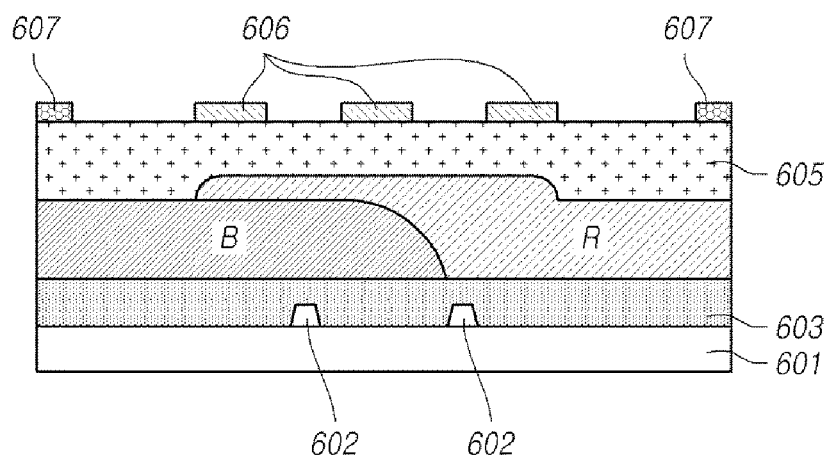

FIGS. 10 and 11 illustrate an example in which the pixel electrode 607 included in the driving pixel is implemented as the touch wiring line. In this case, the pixel metal located on a top surface of the organic or inorganic layer 605 in the driving pixel disposed in the display region is implemented as a touch wiring line.

Referring to FIG. 10, the pixel metal located on the top surface of the organic layer or inorganic layer 605 is implemented as a touch wiring line. FIG. 10 illustrates a case when the pixel metal disposed on the top surface of the organic layer or inorganic layer 605 is implemented as a single wiring line.

FIG. 11 illustrates a case when the pixel metal located on the top surface of the organic layer or inorganic layer 605 is implemented as a touch wiring line. In this case, the pixel metal disposed on the top surface of the organic layer or inorganic layer 605 is implemented as a plurality of wiring lines.

Therefore, according to the present exemplary embodiments, when the pixel metal is implemented by the touch wiring line, the touch wiring line may be implemented as a single wiring line or a plurality of wiring lines.

Figure 12:
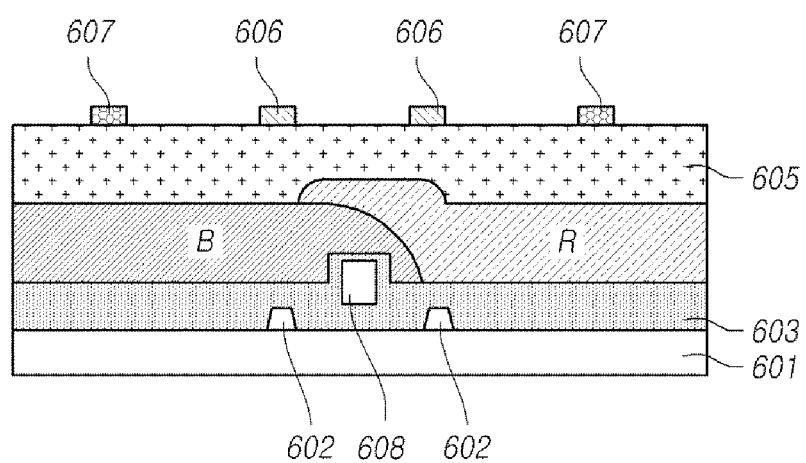
Figure 13:
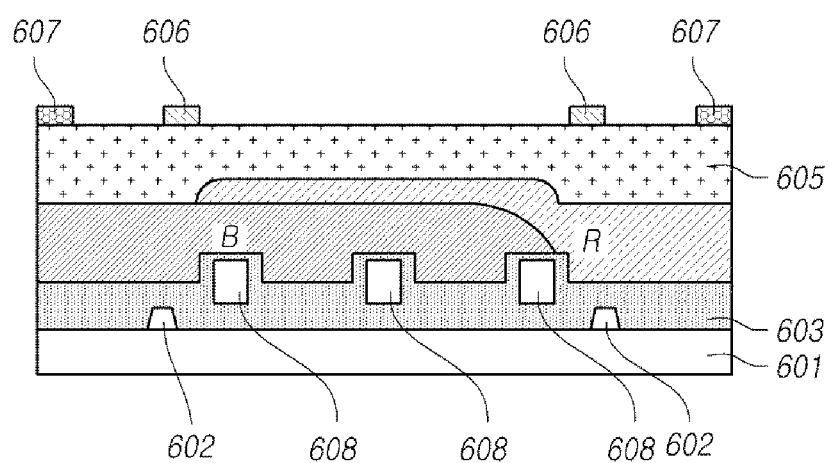

FIGS. 12 and 13 illustrate an example in which the source line 608 included in the driving pixel is implemented as a touch wiring line. In this case, the source line 608 is disposed in the region of the driving pixel where the data line 604 is not disposed and the disposed source line 608 is used as a touch wiring line.

Referring to FIG. 12, the source line 608 is disposed in a region where the data line 604 is not disposed, on the layer on which the data line 604 is disposed and the disposed source line 608 is used as a touch wiring line. In FIG. 12, the disposed source line 608 is implemented as a single wiring line.

Referring to FIG. 13, the source line 608 is disposed in the region where the data line 604 is not disposed to be implemented as a touch wiring line. The source line 608 is implemented as a plurality of wiring lines.

Therefore, according to the present exemplary embodiments, when the source line 608 is disposed in the region where the data line 604 is not disposed to be used as a touch wiring line, the touch wiring line may be implemented as a single wiring line or a plurality of wiring lines.

In the meantime, in the touch display device 100 according to a third exemplary embodiment, when the touch driving circuit 112 and the plurality of touch sensors TS are connected through the dummy pixel 120 disposed in the non-display region, the touch driving circuit 112 and the plurality of touch sensors TS may be connected through a signal line located on a layer which is different from the layer on which the pixel electrode 607 or the source line 608 is disposed.

For instance, even when the touch driving circuit 112 and the plurality of touch sensors TS are connected through the dummy pixel 120, the touch event of the user may be recognized through a different touch wiring line.

For example, the first connecting unit 121 and the second connecting unit 122 which connect the touch driving circuit 112, the dummy pixel 120, and the touch sensors TS may be implemented by a separate signal line.

Hereinafter, an example in which when the first connecting unit 121 and the second connecting unit 112 are implemented by the signal line located on a layer which is different from the layer on which the pixel electrode 607 or the source line 608 is disposed, the touch wiring line is implemented in the driving pixel will be described.

Figure 14A:
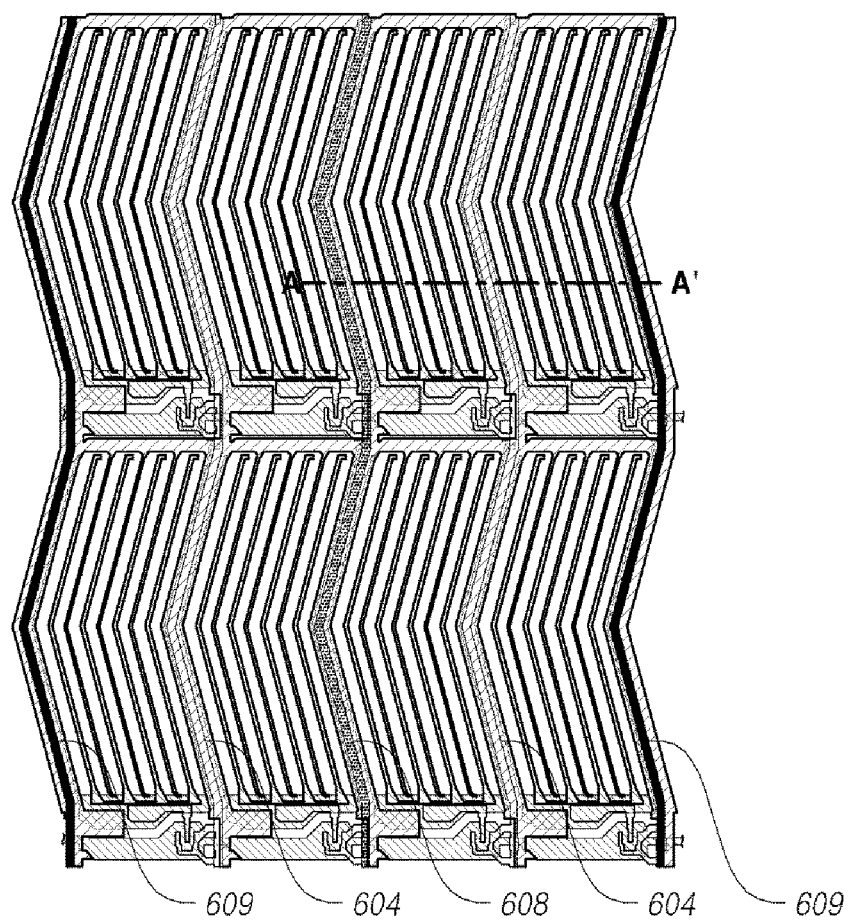
FIGS. 14A and 14B are a plane view and a cross-sectional view of a driving pixel including a wiring line which connects a touch driving circuit and a touch sensor in a touch display device according to a third exemplary embodiment.
Figure 14B:
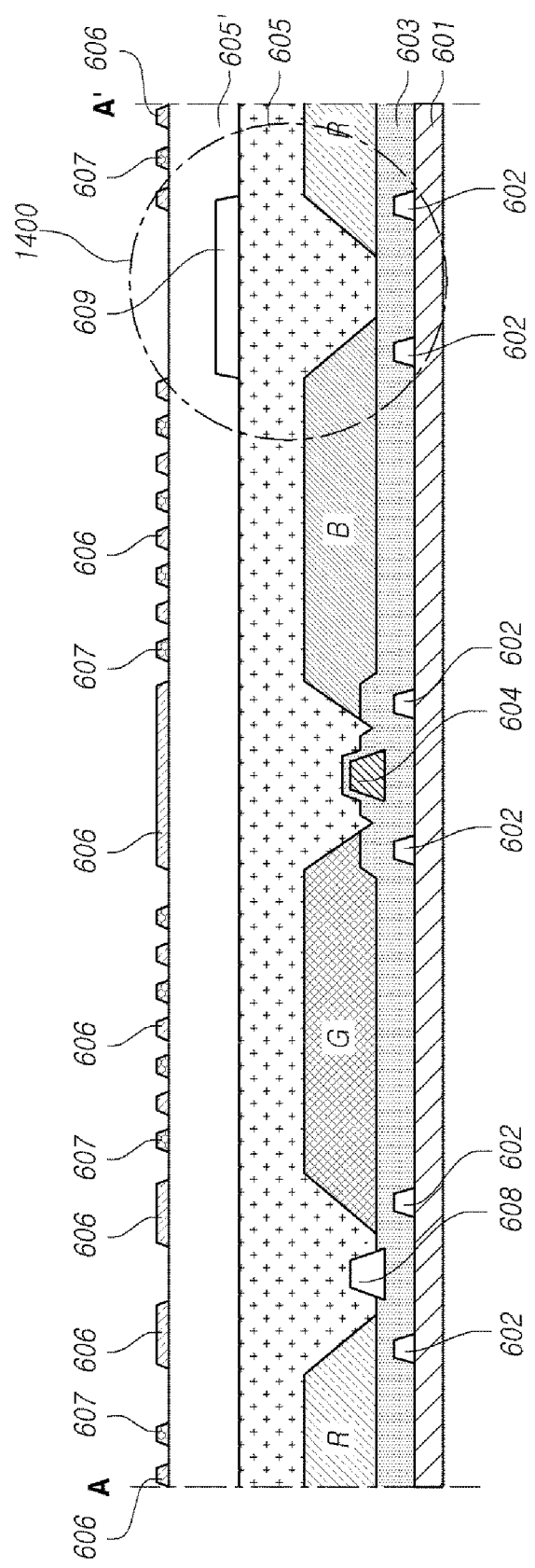

FIG. 14 illustrates a cross-section of a driving pixel in a touch display device 100 according to a third exemplary embodiment. In this case, in a structure in which a data line 604 is disposed for every two pixels, a signal line which is located on a layer which is different from a layer on which a pixel electrode 607 or a source line 608 included in the driving pixel is disposed is implemented as a touch wiring line.

Referring to FIG. 14, a gate metal 602 is disposed on a substrate 601 and a gate insulating layer 603 is disposed thereon. A data line 604 and a color filter are disposed on the gate insulating layer 603 and an organic layer or inorganic layer 605 is disposed thereon.

A signal line 609 is disposed on a top surface of the organic layer or inorganic layer 605 and a common electrode 606 and a pixel electrode 607 are disposed above the signal line.

The signal line 609 may be disposed on a layer which is different from a layer on which the data line 604 is disposed, in a region where the data line 604 is not disposed.

Therefore, even when the touch driving circuit 112 and the touch sensor TS are connected using the driving pixel 120 included in the non-display region, the signal line 609 located on a layer on which the pixel electrode 607 or the source line 608 is not disposed is disposed to recognize the touch event.

When the touch wiring line is implemented using the signal line 607 located on a layer which is different from the layer on which the pixel electrode 607 or the source line 608 is disposed, if the thickness of the signal line 609 is considered, the resistance of the signal line 609 is approximately one hundredth of the resistance of the pixel metal. Therefore, the touch recognizable area may expand.

Further, when the touch wiring line is implemented using a separate signal line 609, the touch wiring line may be implemented by disposing the signal line 609 for every region where the data line 604 is not disposed. However, as illustrated in FIG. 14, the touch wiring line may be implemented using both the source line 608 and the signal line 609.

In this case, the source line 608 and the signal line 609 implemented as the touch wiring line may be alternately disposed for every region where the data line 604 is not disposed or may be overlaid in the same region.

That is, according to the present exemplary embodiments, when the touch wiring line, which connects the touch driving circuit 112 and the plurality of touch sensors TS, is implemented using the dummy pixel 120 disposed in the non-display region, the touch wiring line may be implemented by various ways, such as a pixel metal, a source line 608 or a separate signal line 609. Therefore, the touch wiring line may be designed in accordance with a feature of a product.

Figure 15:
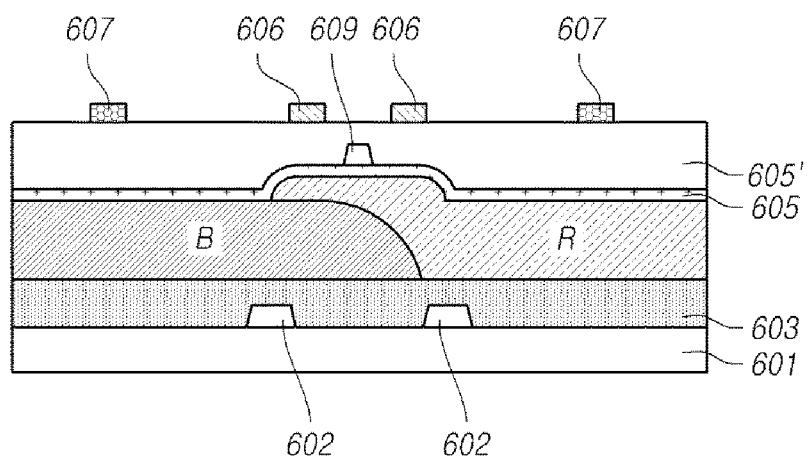
FIGS. 15 to 16 are views illustrating an example of a wiring line which connects a touch driving circuit and a touch sensor in a touch display device according to a third exemplary embodiment.
Figure 16:
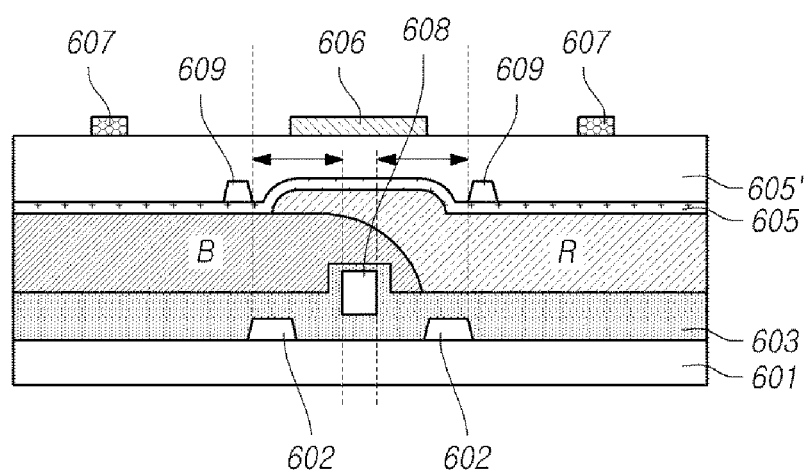

FIGS. 15 and 16 illustrate an implementation example of a region 1400 in a cross-section of a touch display device 100 according to a third exemplary embodiment.

In FIG. 15, the touch wiring line is implemented only by the signal line 609 located on a layer on which the pixel electrode 607 or the source line 608 is not disposed or implemented through the source line 608 and the signal line 609 which are alternately disposed.

Referring to FIG. 15, the signal line 609 is disposed above a region of the driving pixel where the data line 604 is not disposed to be used as a touch wiring line.

In FIG. 16, the touch wiring line is implemented using the source line 608 and the signal line 609. The source line 608 and the signal line 609 are overlaid in the region where the data line 604 is not disposed.

Referring to FIG. 16, both the source line 608 and the signal line 609 are disposed in the region where the data line 604 is not disposed to implement the touch wiring line. In this case, the signal line 609 may be disposed to be spaced apart from the region which is overlaid with the source line 608 by a predetermined distance.

Therefore, even when the touch driving circuit 112 and the touch sensor TS are connected through the dummy pixel 120 disposed in the non-display region, the touch wiring line may be implemented through the signal line 609 located on a layer which is different from the layer on which the pixel electrode 607 or the source line 608 is disposed.

Further, even when the touch wiring line is implemented by the signal line 609 in the region where the data line 604 is not disposed, the touch wiring line may be implemented by the signal line together with the source line 608.

In this case, the signal line 609 and the source line 608 may be alternately disposed or overlaid. When the signal line 609 and the source line 608 are overlaid, the signal line 609 may be disposed to be spaced apart from the region where the signal line 609 and the source line 608 are overlaid by a predetermined distance, so that the touch wiring line may be implemented by various structures.

Figure 17A:
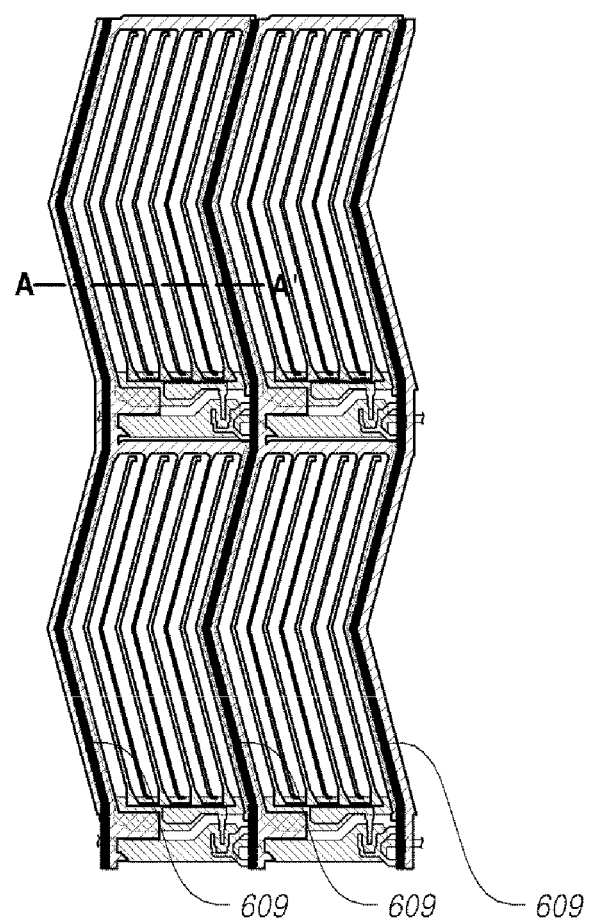
FIGS. 17A and 17B are a plane view and a cross-sectional view of a driving pixel including a wiring line which connects a touch driving circuit and a touch sensor in a touch display device according to a fourth exemplary embodiment.
Figure 17B:
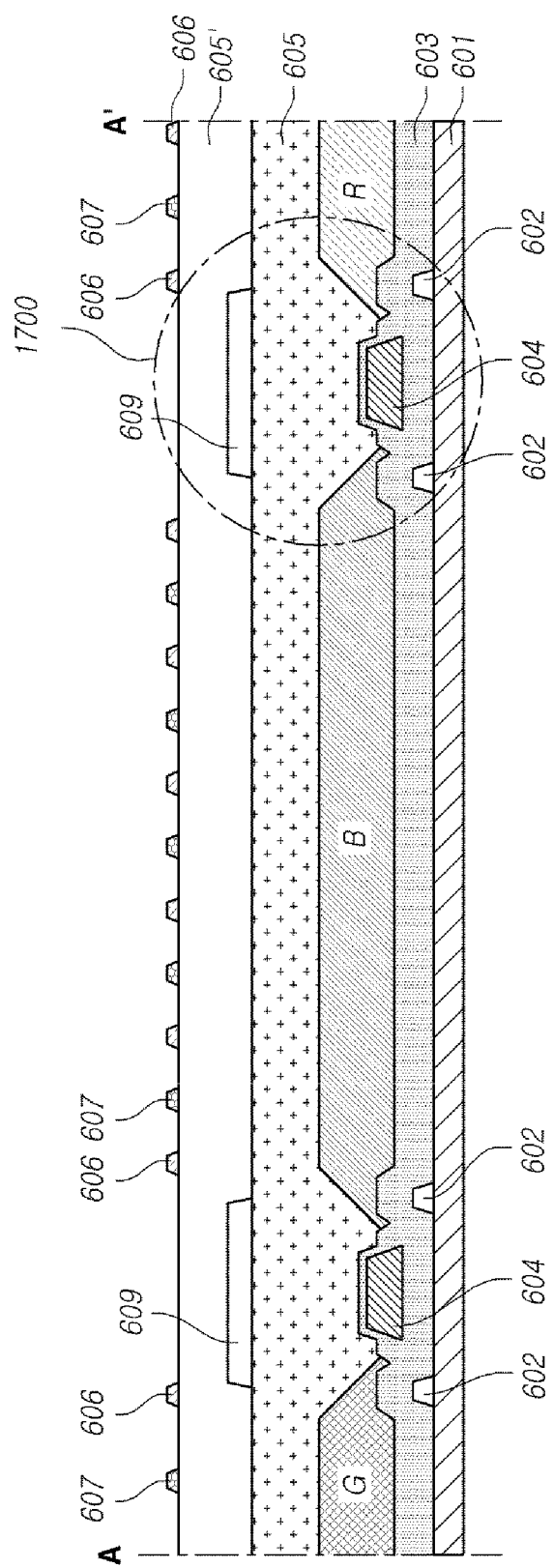

FIGS. 17A and 17B illustrate a plane view and a cross-sectional view of a driving pixel in a touch display device 100 according to a fourth exemplary embodiment.

Referring to FIG. 17A, a touch wiring line is implemented by a signal line located on a layer which is different from a layer on which a pixel electrode 607 or a source line 608 is not disposed in a structure in which the data line 604 is disposed for every pixel. FIG. 17B illustrates a cross-section taken along the line A-A' of FIG. 17A.

Referring to FIG. 17B, a gate metal 602 is disposed on a substrate 601 and a gate insulating layer 603 is disposed thereon. A data line 604 and a color filter are disposed on the gate insulating layer 603 and an organic layer or inorganic layer 605 is disposed thereon.

A signal line 609 is disposed on a top surface of the organic layer or inorganic layer 605 and a common electrode 606 and a pixel electrode 607 are disposed above the signal line 609.

Therefore, a second connecting unit which is electrically connected to a plurality of touch sensors TS is connected to the touch sensors TS through the signal line disposed on a different layer from the pixel electrode 607 or the source line 608.

Since a thickness of the signal line 609 is larger than that of the pixel metal, a resistance of the signal line is approximately one hundredth of a resistance of the pixel metal. Therefore, as compared with a case when the signal line is connected to the touch sensors TS through the pixel metal, the touch recognizable area may be implemented to be broader.

Further, in accordance with the capacitance between the signal line 609 and the data line 604, the touch wiring line may be disposed in the region where the signal line 609 and the data line 604 are overlaid or disposed to be spaced apart from the overlaid region. Therefore, the touch wiring line may be implemented while satisfying the RC load which may sense the touch.

Figure 18:
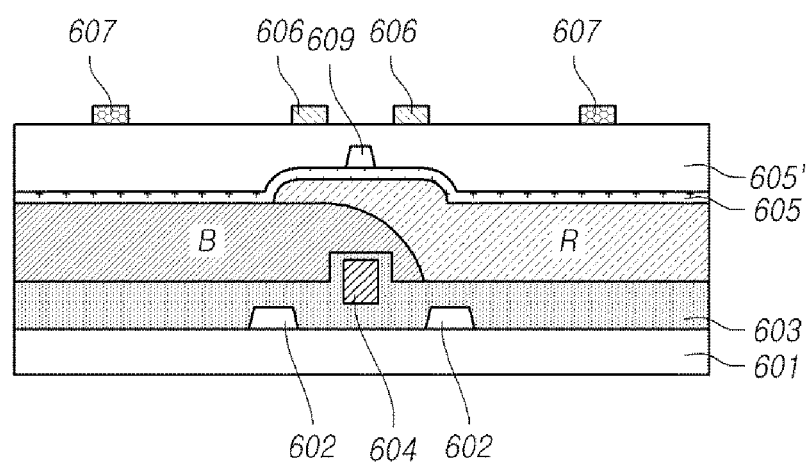
FIGS. 18 to 19 are views illustrating an example of a wiring line which connects a touch driving circuit and a touch sensor in a touch display device according to a fourth exemplary embodiment.
Figure 19:
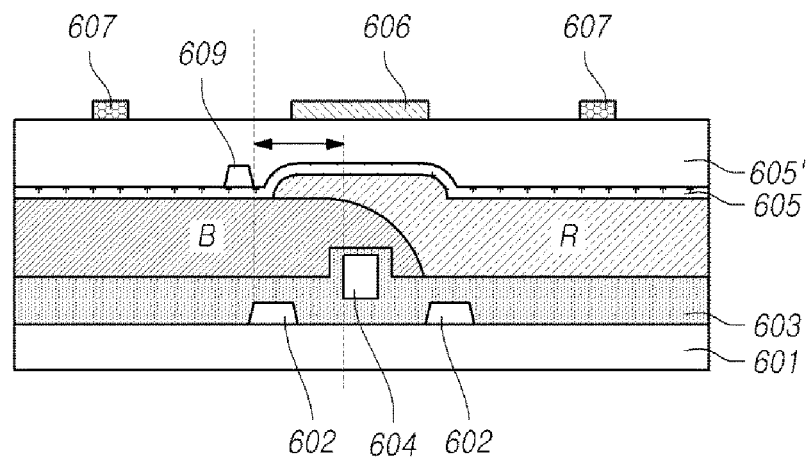

FIGS. 18 and 19 illustrate an enlarged view of a region 1700 of FIG. 17B. The touch wiring line is implemented by a separate signal line in a structure in which the data line 604 is disposed for every pixel.

Referring to FIG. 18, the signal line 609 is disposed above a region where the data line 604 is disposed and the signal line 609 is disposed in a region overlaid with the data line 604.

Referring to FIG. 19, the signal line 609 is disposed above a region where the data line 604 is disposed and the signal line 609 is disposed to be spaced apart from a region overlaid with the data line 604 by a predetermined distance.

Therefore, when the signal line 609 is disposed above the data line 604 and used as a touch wiring line, the data line 604 and the signal line 609 may be designed by various ways such as an overlaid structure or a structure spaced apart from an overlaid region, in accordance with a capacitance of the data line 604 and the signal line 609.

In the above-described exemplary embodiments, a structure in which one touch recognizable area is implemented below the display panel has been mainly described. However, the touch wiring line may be designed to have a different structure, so that a plurality of touch recognizable areas may be implemented.

Figure 20:
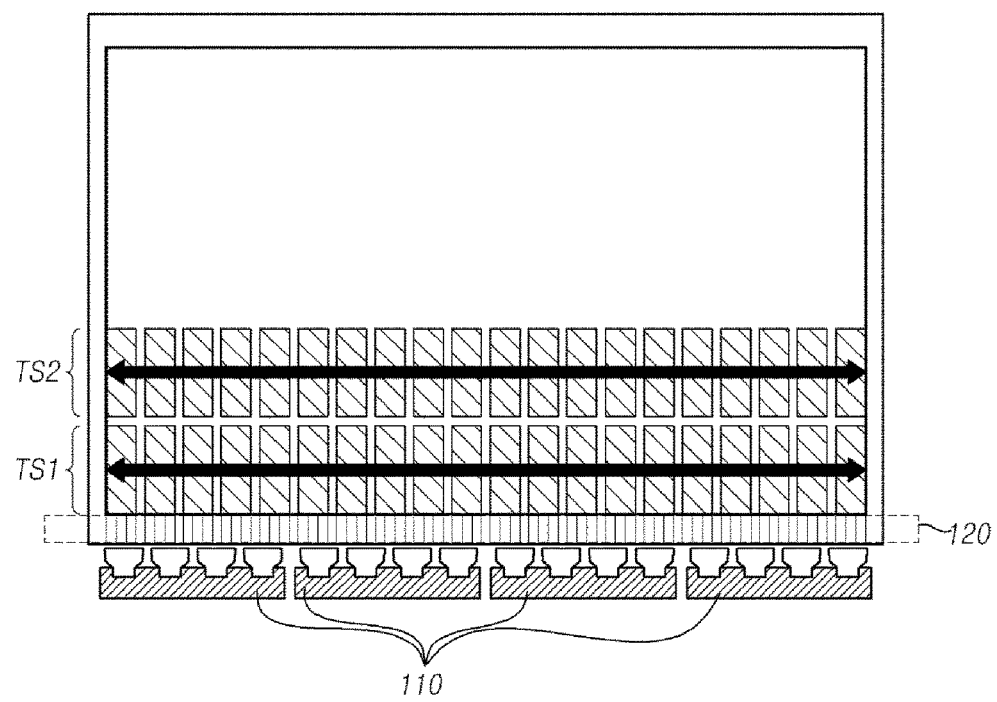
FIG. 20 is a view illustrating a schematic configuration of a touch display device according to a fifth exemplary embodiment.

FIG. 20 illustrates a schematic configuration of a touch display device 100 according to a fifth exemplary embodiment in which a plurality of touch recognizable areas is implemented below the display panel.

Referring to FIG. 20, a plurality of touch sensors TS is disposed in one line to be spaced apart from each other in a partial area of a display region of the display panel adjacent to a non-display region and configures a first touch sensor unit TS1.

Further, a plurality of touch sensors TS is disposed in one line to be spaced apart from each other in a region separated from the region where the first touch sensor unit TS1 is disposed and configures a second sensor unit TS2. The second touch sensor unit TS2 may be disposed to be adjacent to the first touch sensor unit TS1 or spaced apart from the first touch sensor unit TS1 by a predetermined distance.

The first touch sensor unit TS1 is electrically connected to a touch driving circuit 112 disposed in a pad unit 110 through the plurality of dummy pixels 120 disposed in the non-display region. In this case, the first touch sensor unit TS1 may be electrically connected to the touch driving circuit 112 through a pixel electrode 607 included in the plurality of dummy pixels 120.

The second touch sensor unit TS2 is electrically connected to the touch driving circuit 112 disposed in the pad unit 110 through the plurality of dummy pixels 120 disposed in the non-display region. In this case, the second touch sensor unit TS2 may be electrically connected to the touch driving circuit 112 through a source line 608 included in the plurality of dummy pixels 120.

That is, the first touch sensor unit TS1 may be connected to the touch driving circuit 112 through a wiring line configured by the same material as a material which configures the pixel electrode 607 included in the dummy pixel 120. Therefore, the touch sensing may be allowed without using a separate touch wiring line.

Further, the second touch sensor unit TS2 may be connected to the touch driving circuit 112 through a wiring line configured by the same material as a material which configures the source line 608 included in the dummy pixel 120. Therefore, the touch sensing may be allowed without using a separate touch wiring line.

In this case, when the source line 608 is used as the touch wiring line, a thickness of the source line 608 is large. Therefore, a resistance of the source line is approximately one hundredth of a resistance of the pixel metal, so that the delay due to the wiring resistance may be reduced. Further, the source line 608 is disposed in the region where the data line 604 is not disposed, so that the influence by the capacitance with the data line 604 may be avoided. Accordingly, when the source line 608 is used as a touch wiring line, the RC load is reduced, to expand a touch recognizable area.

Therefore, the touch wiring line which is connected to the first touch sensor unit TS1 adjacent to the non-display region is implemented by the pixel metal and the touch wiring line which is connected to the second touch sensor unit TS2 which is not adjacent to the non-display region is implemented by the source line 608. Therefore, the touch recognizable area may be implemented in accordance with characteristics of the touch wiring lines.

Further, a separate process for the touch wiring line is not necessary and a plurality of touch recognizable areas may be implemented below the display panel.

Figure 21:
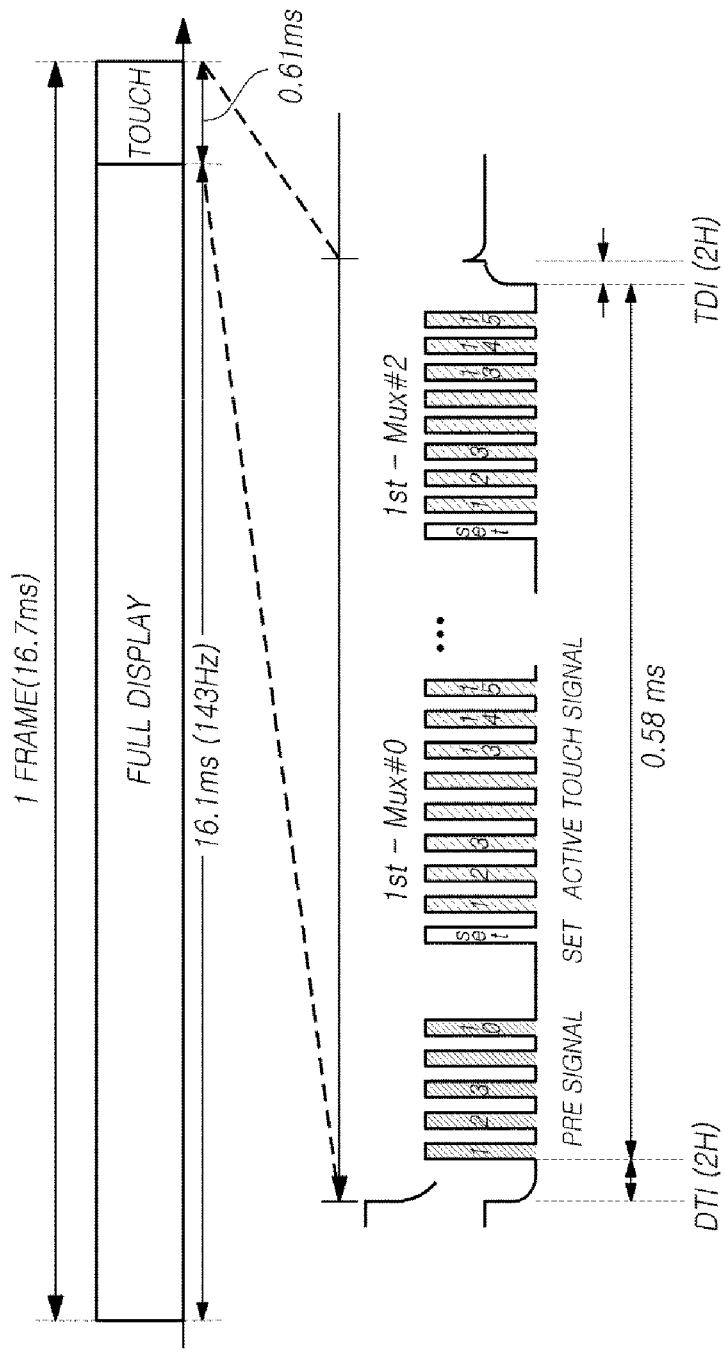
FIG. 21 is a view illustrating an example of a driving timing of a touch display device of the present exemplary embodiments.

FIG. 21 illustrates an example of a timing when the touch sensing is driven when the touch display device 100 according to the present exemplary embodiments implements the touch wiring line using the dummy pixel 120 disposed in the non-display region.

Referring to FIG. 21, the touch display device 100 according to the present exemplary embodiments may sense the touch event of the user on the display panel using a blank period in one frame period.

In one frame period, a common voltage is applied to the touch sensor TS used as a common electrode for a period when a video/image is displayed. Further, a touch driving signal output from the touch driving circuit 112 is applied to the touch sensor TS during a blank period when the video/image is not displayed.

Alternatively, one frame period is time-divided into a display driving period and a touch driving period and a touch driving signal is output to each of the touch sensors TS during the touch driving period to recognize the touch event of the user.

Therefore, according to the present exemplary embodiments, the touch event of the user may be sensed using the blank period of one frame period or the touch event of the user may be sensed during the touch period of a time-divided frame period.

According to the present exemplary embodiments, the touch driving circuit 112 and the plurality of touch sensors TS are connected using the plurality of dummy pixels 120 disposed in the non-display region of the display panel to recognize the touch event of the user.

When the touch wiring line is implemented using the plurality of dummy pixels 120, the touch wiring line is implemented using the same material as the pixel electrode 607 included in the dummy pixel 120. Therefore, a separate process for a touch wiring line is not necessary.

In other words, the touch wiring line may be implemented while reducing the number of masks for implementing the touch wiring line and an aperture ratio reduced due to the arrangement of a separate touch wiring line may be improved.

Further, the touch wiring line is implemented using the same material as the source line 608 included in the dummy pixel 120, so that a separate process for a touch wiring line may not necessary.

In this case, in a pixel structure in which one data line 604 is disposed for every two pixels, the source line 608 is disposed in a region where the data line is not disposed and used as a touch wiring line. Further, a source line 608 having a low resistance is disposed in a position where the capacitance with the data line 604 is reduced and used as a touch wiring line. Therefore, a range of the touch recognizable area may expand.

Further, even when the touch driving circuit 112 and the touch sensor TS are connected through the dummy pixel 120, the touch wiring line may be implemented using a signal line 609 located on a layer which is different from the layer on which the pixel electrode 607 or the source line 608 is disposed.

Therefore, according to the present exemplary embodiments, the touch wiring line is implemented using a plurality of dummy pixels 120 disposed in the non-display region, so that the touch event of the user may be recognized, the touch performance may be improved and various touch wiring designs may be allowed in accordance with the characteristic of the display device.

It will be appreciated that various exemplary embodiments of the present invention have been described herein for purposes of illustration, and that various modifications, changes, and substitutions may be made by those skilled in the art without departing from the scope and spirit of the present invention. Further, the exemplary embodiments disclosed herein are intended to not limit but describe the technical spirit of the present invention and the scope of the technical spirit of the present invention is not restricted by the exemplary embodiments. The protection scope of the present invention should be interpreted based on the following appended claims and it should be appreciated that all technical spirits included within a range equivalent thereto are included in the protection scope of the present invention.

What is claimed is:

1. A touch display device, comprising:
a display panel including a display region in which a plurality of driving pixels is disposed and a non-display region in which a plurality of dummy pixels is disposed;
a plurality of touch sensors which is disposed in one line to be spaced apart from each other in a partial area of the display region adjacent to the non-display region;
a touch driving circuit which drives the plurality of touch sensors;
a first connecting unit which electrically connects the touch driving circuit and the plurality of dummy pixels; and
a second connecting unit which electrically connects the plurality of dummy pixels and the plurality of touch sensors.

2. The touch display device according to claim 1, wherein in the plurality of dummy pixels, the dummy pixels which are electrically connected to the same touch sensor are electrically connected to each other and dummy pixels which are electrically connected to different touch sensors are disposed to be spaced apart from each other.

3. The touch display device according to claim 1, wherein the first connecting unit and the second connecting unit are formed of a same material as a material which configures a pixel electrode included in the plurality of dummy pixels.

4. The touch display device according to claim 3, wherein the second connecting unit is electrically connected to the plurality of touch sensors through a pixel metal included in the plurality of driving pixels.

5. The touch display device according to claim 1, wherein the first connecting unit and the second connecting unit are formed of a same material as a material which configures a source line included in the plurality of dummy pixels.

6. The touch display device according to claim 5, wherein the second connecting unit is electrically connected to the plurality of touch sensors through a pixel metal included in the plurality of driving pixels.

7. The touch display device according to claim 5, wherein the second connecting unit is electrically connected to the plurality of touch sensors through a source line other than a data line among source lines included in the plurality of driving pixels.

8. The touch display device according to claim 1, wherein at least one of the first connecting unit and the second connecting unit is a signal line which is located on a layer different from a pixel electrode or a source line included in the dummy pixels.

9. The touch display device according to claim 8, wherein the second connecting unit is electrically connected to the plurality of touch sensors through a source line other than a data line among source lines included in the plurality of driving pixels or is electrically connected to the plurality of touch sensors through a signal line which is located on a layer different from a pixel metal or the source line included in the plurality of driving pixels.

10. The touch display device according to claim 9, wherein the signal line which is electrically connected to the second connecting unit and is included in the plurality of driving pixels is located in a region of the plurality of driving pixels where the source line is not disposed or located to be spaced apart from a region which is overlaid with a source line other than the data line by a predetermined distance.

11. The touch display device according to claim 9, wherein the signal line which is electrically connected to the second connecting unit and is included in the plurality of driving pixels is located in a region which is overlaid with the data line included in the plurality of driving pixels or located to be spaced apart from a region which is overlaid with the data line by a predetermined distance.

12. The touch display device according to claim 1, wherein the touch driving circuit outputs touch driving signals which drives the plurality of touch sensors during a blank period of one frame period.

13. A touch display device, comprising:
a display panel including a display region in which a plurality of driving pixels is disposed and a non-display region in which a plurality of dummy pixels is disposed;
a first touch sensor unit including a plurality of touch sensors which is disposed in one line to be spaced apart from each other in a partial area of the display region adjacent to the non-display region;
a second touch sensor unit including a plurality of touch sensors which is disposed in one line to be spaced apart from each other in a region separated from the region where the first touch sensor unit is disposed; and
a touch driving circuit which drives the first touch sensor unit and the second touch sensor unit,
wherein the touch driving circuit is electrically connected to the first touch sensor unit through a pixel electrode included in the plurality of dummy pixels and the touch driving circuit is electrically connected to the second touch sensor unit through a source line included in the plurality of dummy pixels.

14. The touch display device according to claim 13, wherein the pixel electrode included in the plurality of dummy pixels is electrically connected to the first touch sensor unit through a pixel metal included in the plurality of driving pixels disposed in the region corresponding to the first touch sensor unit.

15. The touch display device according to claim 13, wherein the source line included in the plurality of dummy pixels is electrically connected to the second touch sensor unit through a source line other than a data line among source lines included in the plurality of driving pixels disposed in the region corresponding to the second touch sensor unit.

16. A touch display panel including a display region in which a plurality of driving pixels is disposed and a non-display region in which a plurality of dummy pixels is disposed, the touch display panel comprising:
a plurality of touch sensors disposed in the display region; and
a touch driving circuit which is disposed in the non-display region and drives the plurality of touch sensors,
wherein the touch driving circuit and the plurality of dummy pixels are electrically connected and the plurality of dummy pixels and the plurality of touch sensors are electrically connected.

17. The touch display panel according to claim 16, wherein in the plurality of dummy pixels, the dummy pixels which are electrically connected to the same touch sensor are electrically connected to each other and dummy pixels which are electrically connected to different touch sensors are disposed to be spaced apart from each other.

18. The touch display panel according to claim 16, wherein the plurality of touch sensors is disposed in one line to be spaced apart from each other in a partial area of the display region adjacent to the non-display region.

19. A touch display device, comprising:
a display panel which includes a display region in which a plurality of driving pixels is disposed and a non-display region disposed around the display region, in which a plurality of dummy pixels is disposed;
a plurality of touch sensors which is disposed in one line to be spaced apart from each other in a partial area of the display region adjacent to the non-display region;
a plurality of electrode patterns disposed in the non-display region; and
a touch driving circuit which drives the plurality of touch sensors,
wherein the plurality of electrode patterns is disposed in the unit corresponding to a width of the plurality of touch sensors and the plurality of touch sensors and the touch driving circuit are electrically connected through the plurality of electrode patterns.

* * * * *